United States Patent [19]
Bakker et al.
[11] Patent Number: 4,799,965
[45] Date of Patent: Jan. 24, 1989

[54] METHOD FOR DEMINERALIZING BEET SUGAR THIN JUICE

[75] Inventors: Age Bakker, Oosterhout; Genesius J. J. M. Schepers, Noordhoek; Kees Koerts, Driebergen, all of Netherlands

[73] Assignee: Cooperatieve Vereniging Suiker Unie U.A., Netherlands

[21] Appl. No.: 94,866

[22] Filed: Sep. 10, 1987

[30] Foreign Application Priority Data

Sep. 12, 1986 [NL] Netherlands ........................ 8602318

[51] Int. Cl.[4] ........................ B01D 59/30; C13D 3/14

[52] U.S. Cl. .................................. 127/46.2; 127/46.3; 127/46.1; 210/660; 426/271

[58] Field of Search .................... 127/46.2, 46.1, 46.3; 210/660; 426/271

[56] References Cited

U.S. PATENT DOCUMENTS

| | | | |
|---|---|---|---|
| 3,784,409 | 1/1974 | Nelson et al. | 127/46.2 |
| 3,785,863 | 1/1974 | Devillers et al. | 127/46.2 |
| 3,834,940 | 9/1974 | Khrleeluddin et al. | 127/46.2 |
| 3,887,391 | 6/1975 | Schoenrock et al. | 127/46.2 |
| 3,982,956 | 9/1976 | Schoenrock et al. | 127/46.2 |
| 4,040,861 | 8/1977 | Walon | 127/46.2 |

FOREIGN PATENT DOCUMENTS

| | | |
|---|---|---|
| 0020124 | 12/1980 | European Pat. Off. . |
| 0102256 | 3/1984 | European Pat. Off. . |
| 2261338 | 9/1975 | France . |

*Primary Examiner*—W. J. Shine
*Assistant Examiner*—Chung K. Pak
*Attorney, Agent, or Firm*—Webb, Burden, Ziesenheim & Webb

[57] ABSTRACT

The present invention relates to a method for demineralizing beet sugar thin juice with a solids content of 10 to 40% by weight by first passing said juice through a solid bed of a weakly acidic cation exchanger in hydrogen form at 10° to 60° C. at a rate of 10 to 180 bed volumes per hour and a contact time of 20 to 360 sec. and then passing the juice through a solid bed of a weakly basic anion exchanger in hydroxyl form in the same temperature range, at the same rate and for the same contact time.

3 Claims, No Drawings

METHOD FOR DEMINERALIZING BEET SUGAR THIN JUICE

The invention relates to a method for demineralizing beet sugar thin juice with a solids content of 10 to 40% by weight by first passing said juice through a solid bed of a weakly acidic cation exchanger in hydrogen form and then passing the juice through a solid bed of a weakly basic anion exchanger in hydroxyl form in the same temperature range and for the same contact time.

In the production of sugar from sugar beets, after the beet cossettes have been leached out in diffusers, raw juice is obtained which, in addition to the desired sugar, also contains non-sugars such as salts, proteins, dye stuffs, pectin and organic acids. Said raw juice is heated to approximately 85° C. and mixed with an excess of slaked lime. The free acids form insoluble salts with the lime which flocculate out with many other impurities such as proteins. A portion of the lime forms calcium monosaccharate and another portion dissolves. Since this slimy precipitate cannot be removed by filtration, saturation with carbon dioxide and steam is carried out. The saccharate which decomposes and the dissolved lime then form together the insoluble calcium carbonate which can in fact be removed by filtration. The raw juice treated in this manner is passed through filter presses which retain turbid constituents.

The filtrate is again treated with lime and carbonic acid and filtered.

The juice remains basic in order to prevent inversion and is boiled in order to convert bicarbonates into carbonates. The solution obtained in this manner is termed thin juice. Said thin juice also still contains non-sugars which are known as molasses-forming substances. These are primarily the salts of potassium, sodium and calcium, which are molasses-forming. The potassium and sodium salts are strongly molasses-forming, the calcium salts are less strongly molasses-forming.

The calcium ions form a precipate (scaling) in the evaporators during the evaporation. Said scaling hampers the heat transfer, which has a very disadvantageous effect on the power consumption of the evaporation.

To prevent said precipitation, the juice can be passed through ion exchangers in order to remove the calcium ions.

This can be done, for example, by:

(1) Passing the thin juice at 85°-90° C. through a strongly acidic resin in the $Na^+$ form.

$$RSO_3Na^+ + CaX_2 \rightleftharpoons (RSO_3)_2Ca^+ + 2\ NaX$$

In this connection, it may be pointed out that the cation exchanger may be regenerated, for example, according to the equation:

$$(R{-}SO_3)_2Ca + 2\ NaCl \rightleftharpoons 2\ RSO_3{-}Na^+ + CaCl_2$$

Disadvantages of such a method are:

a. that sodium ions are introduced into the juice,
b. the capacity of the resin layer is limited,
c. the efficiency of regeneration of the strongly acidic resin with NaCl is low.

(2) According to the method of the U.S. Pat. No. 3,887,391, passing the thin juice at 70° to 95° C. at a rate of 20 to 200 bed volumes per hour through a weakly acidic cation exchanger in $H^+$ form, the $Ca^{++}$ ions being replaced by $H^+$ ions. In this ion exchange process a portion of the $Na^+$ and $K^+$ ions is also replaced by hydrogen.

The contact time of the thin juice with the cation exchanger may be at most 3 minutes because otherwise a strong inversion takes place at these relatively high temperatures.

As a result of said ion exchange process, the pH of the thin juice drops. To restore the pH to 8.9-9.0, it might be possible to add, for example, sodium hydroxide solution, but a drawback thereof is the fact that sodium ions are again introduced into the solution which has the sugar dissolved in it. The U.S. Pat. No. 3,887,391 therefore proposes to restore the pH to 8.9-9.0 by adding magnesium oxide to the solution. However, a drawback thereof is, that the magnesium oxide is sparingly soluble, as a result of which a filtration is subsequently required again in order to remove the unreacted magnesium oxide from the thin juice.

(3) According to the method of the U.S. Pat. No. 3,982,956, passing the thin juice for the purpose of softening first at 70° to 90° C. at a rate of 20-200 bed volumes per hour through a weakly acidic cation exchanger in $H^+$ form and then passing it at a maximum of 50° C. over a weakly basic anion exchanger in OH form. A drawback of said method is that the pH of 8.9-9.0 cannot always be completely restored.

Although in a number of, but not all, cases the $Ca^+$ ions present would be removed and the pH of the juice exposed to cation and anion exchange would be adjusted again to 8.9 to 9.0 if the teaching of the U.S. Pat. Nos. 3,887,391 and 3,982,956 for softening the thin juice were combined, the potassium and sodium ions, which have a disadvantageous effect on the cystallization would not be removed to the extend desired.

If the weakly basic anion exchanger in the method according to U.S. Pat. No. 3,982,956 were to be replaced by a strongly basic anion exchanger in OH form, this would indeed achieve the restoration of the pH to 8.9-9.0, but drawbacks thereof would be that (a) only a portion of the thin juice can be so treated because, if all the thin juice were treated, the pH would be markedly higher than 9 and (b) the strongly basic anion exchanger would be rapidly contaminated by the organic residues present in the thin juice and as a result it would become less effective.

More substantial demineralization of the thin juice than is achieved according to U.S. Pat. Nos. 3,887,391 and 3,982,956 can be achieved by passing the softened thin juice through a cation exchanger in which the $Na^+$ and $K^+$ ions are replaced by $H^+$ ions If this cation exchange were to be carried out with a strongly acidic cation exchanger, the equilibrium reaction $$R{-}SO_3H + C^+A \rightleftharpoons R{-}SO_3{-}C^+ + H^+A^-$$

would be substantially shifted to the right. To regenerate such a cation exchanger, use is made of HCl or $H_2SO_4$:

$$R{-}SO_3{-}C^+ + HX \rightleftharpoons R{-}SO_3H + C^+X^-$$

In this process a considerable amount of chlorine or sulphate ions is therefore introduced into the waste water, which is not appreciated by, and even in a number of cases forbidden by, the authorities who are charged with supervising the water quality in general and waste water in particular.

It therefore appears desirable to carry out the cation exchange with a weakly acidic cation exchanger. In this case, the equilibrium reaction $$R—COOH + C^{+}A^{-} \rightleftharpoons R—COO^{-}C^{+} + H^{+}A^{-}$$

will be shifted substantially to the left. Only if the hydrogen ions were to be withdrawn from the equilibrium, for example, by reaction of the weak acid with a strong base, would the equilibrium reaction be shifted to the right.

European Patent Application 20,124, which in fact relates in particular to the demineralization of thick juice, teaches, inter alia, that the $K^+$ and $Na^+$ ions can be removed from a sugar solution by passing the solution through a mixture of a weakly acidic cation exchanger and a weakly basic anion exchanger. As expected, a juice is obtained in this manner with a pH of 6.6. Apart from this low pH value, the required contact time (up to 90 minutes) and the laborious separate regeneration of two types of resin in one bed are unacceptable drawbacks.

It has been found that, to demineralize the thin juice with a solids content of 10 to 40% by weight without the drawbacks which are associated with demineralizing thick juice, as described in the European Patent Application 20,124, after being passed through a solid bed of a weakly acidic cation exchanger in hydrogen form at 10° to 60° C. at a rate of 10 to 180 bed volumes per hour and a contact time of 20 to 360 sec, the thin juice should then be passed through a weakly basic anion exchanger in hydroxyl form.

In this connection it should also be borne in mind that the thin juice as is obtained in sugar production is consequently at a temperature of 70°–95° C. before it is subjected to ion exchange.

By reducing the temperature of the juice to 20°–60° C., preferably 20°–40° C., the formation of invert sugar is reduced to virtually zero. This reduction in temperature also has a beneficial effect on the time for which the ion exchangers can be used. It may make it necessary to prolong the contact time between juice and ion exchangers, but as a result of the extended contact time, 30 to 50% of the sodium and potassium ions are removed. It is strange that, in the method according to U.S. Pat. No. 3,982,956, the first step, viz. the method according to U.S. Pat. No. 3,887,391, removal of Ca ions is not therefore carried out at 20°–60° C. since the actual method of U.S. Pat. No. 3,982,956 should in fact be carried out at not more than 50° C. since the anion exchanger is not resistant to higher temperatures. The authors of said patents have apparently overlooked this important aspect. As a result of this, if the methods according to U.S. Pat. No. 3,887,391 and U.S. Pat. No. 3,982,956 are combined, only a limited portion of the potassium and sodium ions present would be removed ("some potassium and sodium" in column 1, lines 57–58), whereas according to the present method, as is demonstrated below, a substantial proportion of sodium and potassium ions is removed. This is also revealed by the reduction in colour of 78% instead of 55% and a removal of non-sugars to as much as 30%.

It must not remain unreported that, as a result of passing the thin juice through a weakly acidic cation exchanger at 10° to 60° C. instead of 70° to 95° C., not only is the inversion of the sugars reduced, but the service life of the ion exchangers is also appreciably extended.

In relation to the differences between the state of the art, attention is drawn to the fact that (1) when thin juice is passed through a strongly acidic resin in $Na^+$ form at approximately 90° C., $Ca^{++}$ ions are indeed replaced by $Na^+$ ions but eltber $Na^+$ ions nor $K^+$ ions are replaced by $H^+$ ions;

(2) when thin juice is passed through a weakly acidic cation exchanger in $H^+$ form at 70° to 90° C., only a portion of the $Na^+$ and $K^+$ ions is replaced by $H^+$ ions;

(3) neither U.S. Pat. No. 3,887,391, nor the U.S. Pat. No. 3,982,956 teaches that, if a lower temperature is used for passing the thin juice through the weakly acidic cation exchanger, the transit time can be extended and the replacement of $Na^+$ and $K^+$ ions by $H^+$ ions can take place virtually to a very substantial extent.

In this connection it is pointed out that in the method according to the example of the U.S. Pat. No. 3,982,956, the colour removal is 55% and the removal of non-sugars is 5%, whereas, if the method according to the present invention is used, the colour removal is 70% and the removal of non-sugars is 30%.

Preferably, use is made of Lewatit CA 9222 and OC 1057 as weakly basic anion exchangers.

The method according to the invention can be carried out both batchwise and continuously. At the same time it is pointed out that it is preferable to carry it out continuously.

The basic anion exchangers can be regenerated with a strong base or ammonia.

EXAMPLE 1

The method described in U.S. Pat. 3,887,391 was repeated.

Sugar beet juice having a Brix degree level of 14, a calcium content of 70 m.g./l. of juice, a potassium and sodium content of 50 meq/l. of juice, and invert content of 0.14% per 100 Brix degrees and a colour of 2000 ICUMSA units is passed for 5 hours at a rate of 60 bed volumes per hour at 90° C. through a column filled with a weakly acidic ion exchange resin in hydrogen form (Lewatit CBP80). The contact time was 1 min.

The juice was then passed at half the rate at 40° C. through a weakly basic ion exchange resin in hydroxyl form (Lewatit CA 9222). This produced a juice with a calcium content of 0 m.g./l. of juice, a potassium and sodium content of 45 meg/l. of juice, an invert content of 0.16% per 100 Brix degrees, a colour of 1000 ICUMSA units and a pH of 8.9.

This signifies 100% calcium removal, 10% potassium and sodium removal, 50% colour removal and an invert increase of 14%.

EXAMPLE 2

The same sugar beet juice as was used in the comparative example was passed for 5 hours at a flow rate of 20 bed volumes per hour at 40° C. through the weakly acidic resin and then through the weakly basic resin (at a rate of 10 bed volumes per hour).

The contact time was 3 min.

The juice obtained now also has a calcium content of 0 m.g./l. of juice, a potassium/sodium content of 32 meq/l. of juice, an invert content of 0.14% per 100 Brix degrees, a colour of 500 ICUMSA units and a pH of 8.8.

This signifies 100% calcium removal, 36% potassium and sodium removal, 75% colour removal and an invert increase of 0%.

EXAMPLE 3

The same beet juice as used in Example I was passed for 5 hours at a rate of 20 bed volumes per hour at 86° C. through the weakly acidic resin CNP 80 and then at 40° C. through the weakly basic resin CA 9222.

The juice obtained now has a calcium/sodium content of 32 meq/l. of juice, a calcium content of 0 m.g./l. of juice, an invert content of 0.38% per 100 Brix degrees, a colour of 600 ICUMSA units and a pH of 8.9.

This signifies 100% calcium removal, 36% potassium and sodium removal, 70% colour removal and an invert increase of 70%.

EXAMPLE 4

The same beet juice as used in Example I was passed for 5 hours at a rate of 20 bed volumes per hour at 10° C. through a weakly acidic CNP 80 resin and then at 10° C. through a weakly basic CA 9222 resin.

The juice obtained now has a potassium/sodium content of 35 meq/l. of juice, a calcium content of 0 m.g./l. of juice, an invert content of 0.14% per 100 Brix degrees and a colour content of 520 ICUMSA units and a pH of 8.9.

This signifies 100% calcium removal, 30% potassium and sodium removal, 74% colour removal and an invert increase of 0%.

EXAMPLE 5

The same beet juice used in Example I was passed for 5 hours at a rate of 30 bed volums per hour at 90° C. through a weakly acidic resin and then at 60° C. through the weakly basic resin.

The juice obtained has a potassium/sodium content of 36 meq/l. of juice, a calcium content of 0 m.g., an invert content of 0.28% per 100 Brix degrees and a colour of 500 ICUMSA units and a pH of 8.8.

This signifies 100% calcium removal, 28% potassium/ sodium removal, 75% colour removal and an invert increase of 100%.

EXAMPLE 6

The same beet juice as used in Example I was now passed for 5 hours at a rate of 30 bed volumes per hour at 40° C. through a weakly acidic resin and then at 40° C. through a weakly basic resin.

The juice obtained has a potassium/sodium content of 37 meq/l. of juice, a calcium content of 0 m.g., an invert content of 0.14% per 100 Brix degrees, a colour of 500 ICUMSA units and a pH of 8.8. This means 100% calcium removal, 26% potassium/sodium removal, 75% colour removal and an insert increase of 0%.

EXAMPLE 7

Sugar beet juice with a dry solids content of 30 Brix degrees, a purity of 92%, a calcium content of 153 m.g./l. of juice, a potassium/sodium content of 105 meq/l. of juice and a colour of 3630 ICUMSA units was passed for 5 hours at a rate of 15 bed volumes per hour at 40° C. through the weakly basic resin CNP 80 and with a flow of 7.5 bed volumes per hour at 40° C. through the weakly basic resin Lewatit CA 9222.

The resin obtained had a calcium content of 0 m.g., a potassium/sodium content of 78 meq/l. of juice, a colour of 1070 ICUMSA units and a pH of 9.1.

This means 100% calcium removal, 26% potassium/ sodium removal and 70% colour removal.

EXAMPLE 8

The same sugar beet juice as was used in Example I, was now passed for 5 hours at a rate of 20 bed volumes per hour at 40° C. through CNP 80 and then at a rate of 10 bed volumes per hour through the weakly basic resin IMAC A 20 SU, which is a polystyrene resin.

The juice obtained has a potassium/sodium content of 34 meq/l. of juice, an invert content of 0.14% per 100 Brix degrees and a colour of 800 ICUMSA units. The average pH is 5 5.

This low pH means that the action of the weakly basic resin is much poorer than that of the CA 9222. This will result in a large amount of invert sugar and colour in the evaporation and boiling station and is therefore impermissible.

EXAMPLE 9

The procedure is the same as that of Comparative Example 4. Now the weakly basic resin Lewatit MP 62 was used instead of IMAC A 20 SU. This is a polystyrene resin.

The juice obtained also now had a potassium and sodium content of 34 meq/l. of juice and an invert content of 0.14%. The colour was now 600 ICUMSA units. The average pH was 7. This pH is also too low. If it is nevertheless desired to use this combination, this means that sodium hydroxide solution has to be added, which in turn nullifies some of the purification.

EXAMPLE 10

The procedure is also in this case identical to that described in Comparative Example 4. Now the Duolite resin A 29 (a polyacrylate resin) is used instead of IMAC A 20 SU. The juice obtained also now has a potassium/sodium content of 34 meq/l. of juice, an invert content of 0.14% and a calcium content of 0 m.g./l. of juice.

The colour is now 600 ICUMSA units and the average pH is 7.6. This pH is also too low.

EXAMPLE 11

The beet juice was now passed for 5 hours at a rate of 20 bed volumes per hour at 40° C. through the weakly acidic resin Duolite CC 3 and then at 10 bed volumes per hour at 40° C. through the weakly basic resin CA 9222.

The juice obtained has a calcium content of 0 m.g./l. of juice, a potassium/sodium content of 35 meq/l. of juice, an invert content of 0.14% per 100 Brix degrees and a colour content of 500 ICUMSA units.

The effect of CC 3 is thus equal to that of CNP 80, but the swelling (expansion) of the resin during the loading was now 100%, whereas the swelling of the CNP 80 during the loading is only 40%.

This higher percentage of swelling will present more problems during the operation of the columns and shorten the life of the resin.

EXAMPLE 12

The same sugar beet juice as used in Example I was passed for 5 hours at a rate of 20 bed volumes per hour at 40° C. through CNP 80 and then at a rate of 10 bed volumes per hour through the weakly basic resin Lewatit OC 1057.

The juice obtained has a calcium content of 0 m.g./l. of juice, a potassium/sodium content of 36 meq/l. of juice an invert content of 0.14% per 100 Brix degrees, a colour of 480 ICUMSA units and a pH of 8.9.

This means 100% calcium removal, 28% potassium/-sodium removal, 76% colour removal and an invert increase of 0%.

We claim:

1. Method for demineralizing beet sugar thin juice with a solids content of 10 to 40% by weight by first passing said juice through a solid bed of a weakly acidic cation exchanger in hydrogen form and then passing said juice through a solid bed of a weakly basic anion exchanger in hydroxyl form in the same temperature range, at the same rate and for the same contact time, characterized in that the juice is passed through said weakly acidic cation exchanger at 10° to 40° C. at a rate of 10 to 180 bed volumes per hour and a contact time of 20 to 360 sec and is then passed through said weakly basic anion exchanger.

2. Method according to claim 1, characterized in that said juice has a solids content of 25% by weight.

3. Method according to claim 1, characterized in that basic anion exchange is carried out with said weakly basic anion exchanger with a contact time of 3 min.

* * * * *

UNITED STATES PATENT AND TRADEMARK OFFICE

CERTIFICATE OF CORRECTION

PATENT NO. : 4,799,965

Page 1 of 2

DATED : January 24, 1989

INVENTOR(S) : Age Bakker, Genesius J. J. M. Schepers and Kees Koerts

It is certified that error appears in the above-identified patent and that said Letters Patent is hereby corrected as shown below:

Column 1 Line 50 before "RSO" (first occurrence) insert --2--.

Column 2 Line 35 "cystallization" should read --crystallization--.

Column 4 Line 7 "eltber" should read --neither--.

Column 4 Line 33 "EXAMPLE 1" should read --Comparative Example 1--.

Column 4 Line 48 "45 meg/l." should read --45 meq/l--.

Column 4 Line 55 "EXAMPLE 2" should read --Example I--.

Column 5 Line 1 "EXAMPLE 3" should read --Comparative Example 2--.

Column 5 Line 13 "70%" should read --170%--.

Column 5 Line 15 "EXAMPLE 4" should read --Example II--.

Column 5 Line 29 "EXAMPLE 5" should read --Comparative Example 3--.

UNITED STATES PATENT AND TRADEMARK OFFICE

CERTIFICATE OF CORRECTION

PATENT NO. : 4,799,965

DATED : January 24, 1989

INVENTOR(S) : Age Bakker, Genesius J. J. M. Schepers and Kees Koerts

It is certified that error appears in the above-identified patent and that said Letters Patent is hereby corrected as shown below:

Column 5 Line 42 "EXAMPLE 6" should read --Example III--.

Column 5 Line 52 "insert" should read --invert--.

Column 5 Line 55 "EXAMPLE 7" should read --Example IV--.

Column 6 Line 1 "EXAMPLE 8" should read --Comparative Example 4--.

Column 6 Line 11 "5 5" should read --5.5--.

Column 6 Line 18 "EXAMPLE 9" should read --Comparative Example 5--.

Column 6 Line 31 "EXAMPLE 10" should read --Comparative Example 6--.

Column 6 Line 42 "EXAMPLE 11" should read --Example V--.

Column 6 Line 60 "EXAMPLE 12" should read --Example VI--.

Signed and Sealed this

First Day of August, 1989

*Attest:*

DONALD J. QUIGG

*Attesting Officer*

*Commissioner of Patents and Trademarks*